United States Patent
Borlick et al.

(10) Patent No.: US 9,864,534 B1
(45) Date of Patent: Jan. 9, 2018

(54) VALIDATION OF STORAGE VOLUMES THAT ARE IN A PEER TO PEER REMOTE COPY RELATIONSHIP

(71) Applicant: INTERNATIONAL BUSINESS MACHINES CORPORATION, Armonk, NY (US)

(72) Inventors: Matthew G. Borlick, Tucson, AZ (US); Lokesh M. Gupta, Tucson, AZ (US); Brian A. Rinaldi, Tucson, AZ (US); Micah Robison, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/336,415

(22) Filed: Oct. 27, 2016

(51) Int. Cl.
*G06F 12/10* (2016.01)
*G06F 3/06* (2006.01)

(52) U.S. Cl.
CPC ............ *G06F 3/0619* (2013.01); *G06F 3/065* (2013.01); *G06F 3/067* (2013.01)

(58) Field of Classification Search
CPC .............................. G06F 3/0619; G06F 3/067
USPC .......................................................... 711/162
See application file for complete search history.

(56) References Cited

U.S. PATENT DOCUMENTS

| | | | |
|---|---|---|---|
| 6,442,709 B1 | 8/2002 | Beal et al. | |
| 7,117,323 B1 | 10/2006 | Delaney | |
| 7,188,222 B2 | 3/2007 | Micka et al. | |
| 7,647,463 B2 | 1/2010 | Jarvis et al. | |
| 7,685,386 B2 | 3/2010 | Bitar | |
| 7,962,780 B2 | 6/2011 | Harris, Jr. et al. | |
| 8,850,141 B2 | 9/2014 | Zohar et al. | |
| 9,395,925 B2* | 7/2016 | Ash | G06F 3/0619 |
| 2002/0069137 A1 | 6/2002 | Hiroshige et al. | |
| 2002/0169996 A1 | 11/2002 | King et al. | |
| 2005/0114557 A1 | 5/2005 | Arai et al. | |
| 2006/0010299 A1* | 1/2006 | Zhang | H04L 67/1097 711/162 |

(Continued)

OTHER PUBLICATIONS

List of IBM Patents or Patent Applications Treated as Related, dated Oct. 27, 2016, pp. 2.

(Continued)

*Primary Examiner* — Jae Yu
(74) *Attorney, Agent, or Firm* — Rabindranath Dutta; Konrad Raynes Davda & Victor LLP

(57) ABSTRACT

A peer to peer remote copy operation is performed between a primary storage controller and a secondary storage controller, to establish a peer to peer remote copy relationship between a primary storage volume and a secondary storage volume. Subsequent to indicating completion of the peer to peer remote copy operation to a host, a determination is made as to whether the primary storage volume and the secondary storage volume have identical data, by performing operations of staging data of the primary storage volume from auxiliary storage of the primary storage controller to local storage of the primary storage controller, and transmitting the data of the primary storage volume that is staged, to the secondary storage controller for comparison with data of the secondary storage volume stored in an auxiliary storage of the secondary storage controller.

12 Claims, 10 Drawing Sheets

(56) References Cited

U.S. PATENT DOCUMENTS

2009/0043979 A1    2/2009  Jarvis
2010/0205386 A1    8/2010  Yamashita
2011/0314347 A1   12/2011  Nakano et al.
2015/0046668 A1    2/2015  Hyde et al.

OTHER PUBLICATIONS

U.S. Appl. No. 15/336,431, filed Oct. 27, 2016, (18.671).
Office Action dated Feb. 9, 2017, pp. 17, for U.S. Appl. No. 15/336,431, filed Oct. 27, 2016, (18.671).
Response dated May 9, 2017, pp. 12, to Office Action dated Feb. 9, 2017, pp. 17, for U.S. Appl. No. 15/336,431, filed Oct. 27, 2016, (18.671).
Final Office Action dated Jun. 26, 2017, pp. 21, for U.S. Appl. No. 15/336,431, filed Oct, 27, 2017.

* cited by examiner

VALIDATION OF STORAGE VOLUMES THAT ARE IN A PEER TO PEER REMOTE COPY RELATIONSHIP

BACKGROUND

1. Field

Embodiments relate to the validation of storage volumes that are in a peer to peer remote copy relationship.

2. Background

A storage controller may control access to storage for one or more host computational devices that may be coupled to the storage controller over a network. A storage management application that executes in the storage controller may manage a plurality of storage devices, such as disk drives, tape drives, flash drives, direct access storage devices (DASD), etc., that are coupled to the storage controller. A host may send Input/Output (I/O) commands to the storage controller and the storage controller may execute the I/O commands to read data from the storage devices or write data to the storage devices.

In certain storage systems, a primary storage controller that provides I/O access to storage volumes may be coupled to a secondary storage controller. The secondary storage controller may store backup copies of storage volumes of the primary storage controller. The storage volumes of the primary storage controller are referred to as primary storage volumes and the backup copies of storage volumes are referred to as secondary storage volumes.

The secondary storage volumes may be generated either synchronously or asynchronously by copying primary storage volumes from the primary storage controller to the secondary storage controller, and this process may be referred to as a peer to peer remote copy (PPRC). Synchronous PPRC causes each write to a primary storage volume to be performed to the secondary storage volume as well, and the I/O is only considered complete when writes to both the primary storage volume and the secondary storage volume have completed. In asynchronous PPRC, an I/O is considered to be complete when updates have been made to the primary storage volume, and the primary storage volume is copied to the secondary storage volume when time permits.

SUMMARY OF THE PREFERRED EMBODIMENTS

Provided are a method, system, and computer program product in which a peer to peer remote copy operation is performed between a primary storage controller and a secondary storage controller, to establish a peer to peer remote copy relationship between a primary storage volume and a secondary storage volume. Subsequent to indicating completion of the peer to peer remote copy operation to a host, a determination is made as to whether the primary storage volume and the secondary storage volume have identical data, by performing operations of staging data of the primary storage volume from auxiliary storage of the primary storage controller to local storage of the primary storage controller, and transmitting the data of the primary storage volume that is staged, to the secondary storage controller for comparison with data of the secondary storage volume stored in an auxiliary storage of the secondary storage controller.

In certain embodiments, the determining of whether the primary storage volume and the secondary storage volume have identical data is performed, in response to determining that an input/output (I/O) load in the primary storage controller is lower than a predetermined threshold.

In further embodiments, completion of the peer to peer remote copy operation is indicated by the primary storage controller to a host prior to completion of data destages to the auxiliary storage of the primary storage controller from the local storage of the primary storage controller, and prior to completion of data destages to the auxiliary storage of the secondary storage controller from the local storage of the secondary storage controller.

In additional embodiments, the secondary storage controller receives the data of the primary storage volume that is staged. The secondary storage controller stages data of the secondary storage volume to local storage of the secondary storage controller from auxiliary storage of the secondary storage controller, to determine whether the primary storage volume and the secondary storage volume have identical data. In response to determining that the primary storage volume and the secondary storage volume do not have identical data, the secondary storage controller sends an error condition to the primary storage controller.

In yet additional embodiments, in response to receiving the error condition, the primary storage controller suspends the peer to peer remote copy relationship between the primary storage volume and the secondary storage volume.

In certain embodiments, the determining of whether the primary storage volume the secondary storage volume have identical data is performed at predetermined intervals of time.

In further embodiments, the determining of whether the primary storage volume the secondary storage volume have identical data is performed at predetermined times indicated by a user, wherein a tertiary storage volume of a tertiary storage controller maintains another peer to peer remote copy relationship with the secondary storage volume, and wherein an error condition is generated if the primary storage volume, the secondary storage volume and the tertiary storage volume do not have identical data.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Certain embodiments compare a primary storage volume stored in auxiliary storage of a primary storage controller to a secondary storage volume stored in auxiliary storage of a secondary storage controller, where the primary storage volume and the secondary storage volume are in a peer to peer remote copy relationship. The comparison of the primary storage volume to the secondary storage volume is not performed while the peer to peer remote copy operations are in progress, but subsequent to completion of the peer to peer remote copy operations.

In certain embodiments, the comparison of the primary storage volume to the secondary storage volume is performed by a peer to peer remote copy validation application that executes as a background application when the I/O workload is below a predetermined threshold. In other embodiments, the comparison of the primary storage volume to the secondary storage volume is performed at periodic intervals of time or at specific times designated by a user.

Exemplary Embodiments

Figure 1:
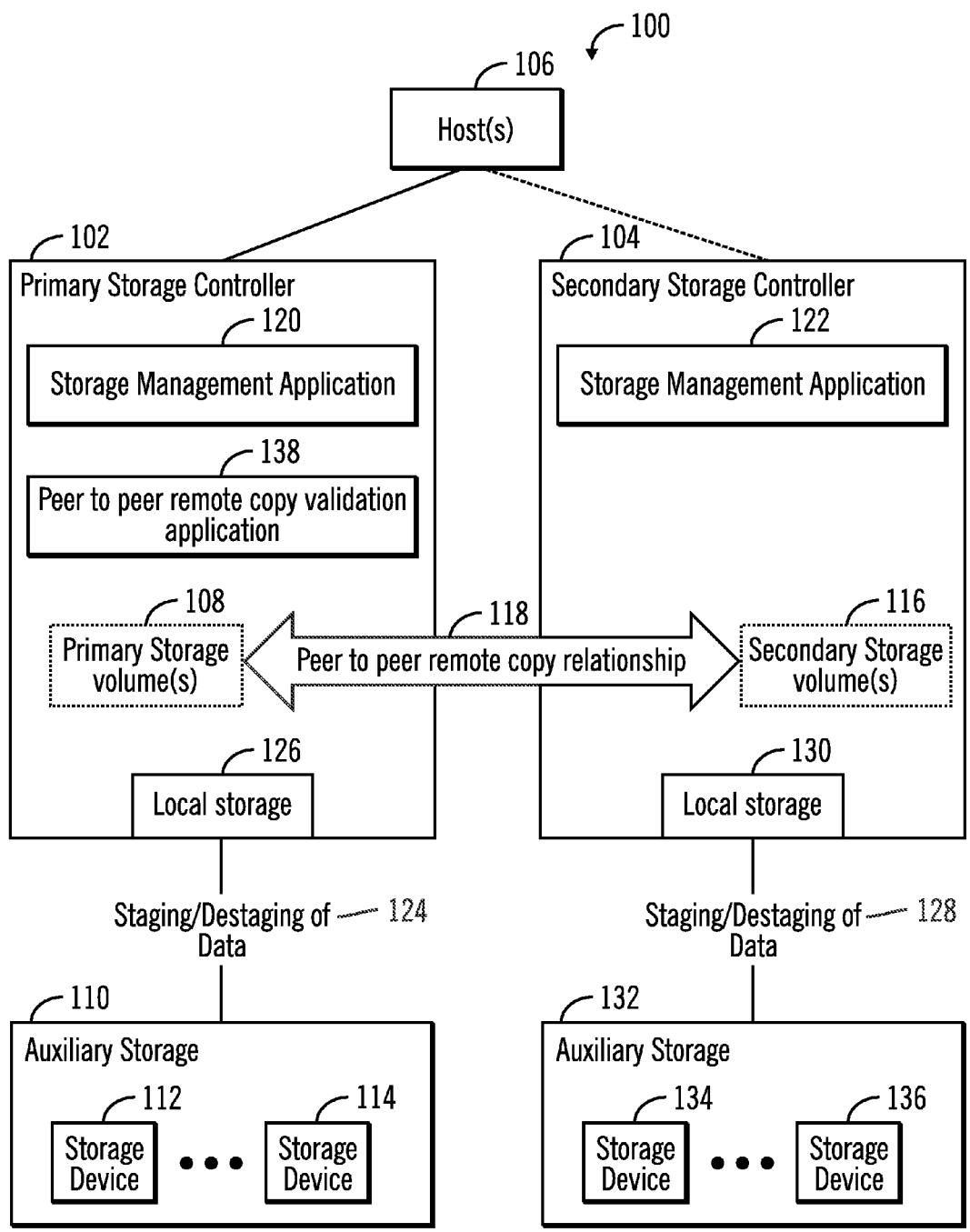
FIG. 1 illustrates a block diagram of a computing environment comprising a primary storage controller coupled to a secondary storage controller, in accordance with certain embodiments.

FIG. 1 illustrates a block diagram of a computing environment 100 comprising a primary storage controller 102 that is coupled to a secondary storage controller 104. The primary storage controller 102 receives I/O requests from one or more hosts 106, and responds to the I/O requests by performing read or write operations with respect to primary storage volumes 108. The primary storage volumes 108 are logical storage volumes corresponding to physical storage volumes that store data in auxiliary storage 110 comprising a plurality of storage devices 112, 114, where the auxiliary storage 110 is coupled to the primary storage controller 102.

The primary storage controller 102, the secondary storage controller 104, and the hosts 106 may comprise any suitable computational device including those presently known in the art, such as, a personal computer, a workstation, a server, a mainframe, a hand held computer, a palm top computer, a telephony device, a network appliance, a blade computer, a processing device, a controller, etc. The plurality of storage controllers 102, 104 may provide redundancy because if the primary storage controller 102 undergoes a failure from which recovery is not possible, the secondary storage controller 104 may be configured to communicate with the hosts 106 and the secondary storage controller 104 may perform the functions of the primary storage controller 102 that failed. Additionally, in case of loss of data in the primary storage volumes 108 of the primary storage controller 102, the lost data may be recovered from the secondary storage volumes 116 that are in a peer to peer remote copy relationship 118 with the primary storage volumes 108.

The primary storage controller 102, the secondary storage controller 104, and the hosts 106 may be elements in any suitable network, such as, a storage area network, a wide area network, the Internet, an intranet. In certain embodiments, the primary storage controller 102, the secondary storage controller 104, and the hosts 106 may be elements in a cloud computing environment.

A storage management application 120 that executes in the primary storage controller 102 interfaces with a storage management application 122 that executes in the secondary storage controller 104 to establish the peer to peer remote copy relationship between the primary storage volumes 108 and the secondary storage volumes 116. The storage management application 120 may also perform staging of data (shown via reference numeral 124) from the auxiliary storage 110 of the primary storage controller 102 to the local storage 126 of the primary storage controller 102. Similarly, the storage management application 122 may perform staging of data (shown via reference numeral 128) from the auxiliary storage 132 of the secondary storage controller 104 to the local storage 130 of the secondary storage controller 104, where the auxiliary storage 132 of the secondary storage controller 104 is comprised of a plurality of storage devices 134, 136. The staging of data may comprise movement of data.

The storage management application 120 may also perform destaging of data (shown via reference numeral 124) from the local storage 126 of the primary storage controller 102 to the auxiliary storage 110 of the primary storage controller 102. Similarly, the storage management application 122 may perform destaging of data (shown via reference numeral 128) from the local storage 130 of the secondary storage controller 104 to the auxiliary storage 132 of the secondary storage controller 104. The destaging of data may comprise movement of data.

The local storage 126, 130 may be comprised of a volatile and/or a non-volatile storage. For example, in certain embodiments the local storage 126, 130 may be comprised of dynamic random access memory (DRAM) and/or solid state memory. The auxiliary storage 110, 132 have a much larger amount of storage capacity in comparison to the local storage 126, 130, and the auxiliary storage 110, 132 may be comprised of hard disks or other storage devices. A host application may be made aware that an I/O operation is complete once data has successfully been written to the local storage 126 even though it has not been destaged to the auxiliary storage 110. At an opportune time, data may be destaged from the local storage 126 to the auxiliary storage 110, to free up space in the local storage 126. Typically, the local storage 126 is coupled via a bus to the processor of the primary storage controller 102 and is accessed much faster in comparison to the auxiliary storage 110 that may be external to an enclosure of the primary storage controller 102, and the local storage 130 of the secondary storage controller 104 is similarly designed.

The primary storage controller 102 also includes a peer to peer remote copy validation application 138, where in certain embodiments the peer to peer remote copy validation application 138 compares a primary storage volume 108 stored in auxiliary storage 110 of a primary storage controller 102 to a secondary storage volume 116 stored in auxiliary storage 132 of a secondary storage controller 104, where the primary storage volume 108 and the secondary storage volume 116 are in a peer to peer remote copy relationship 118. The comparison of the primary storage volume 108 to the secondary storage volume 116 is not performed while peer to peer remote copy operations are in progress, but subsequent to completion of the peer to peer remote copy operations.

In certain embodiments, the peer to peer remote copy validation application 138 and the storage management applications 120, 122 may be implemented in software, firmware, hardware or any combination thereof.

Figure 2:
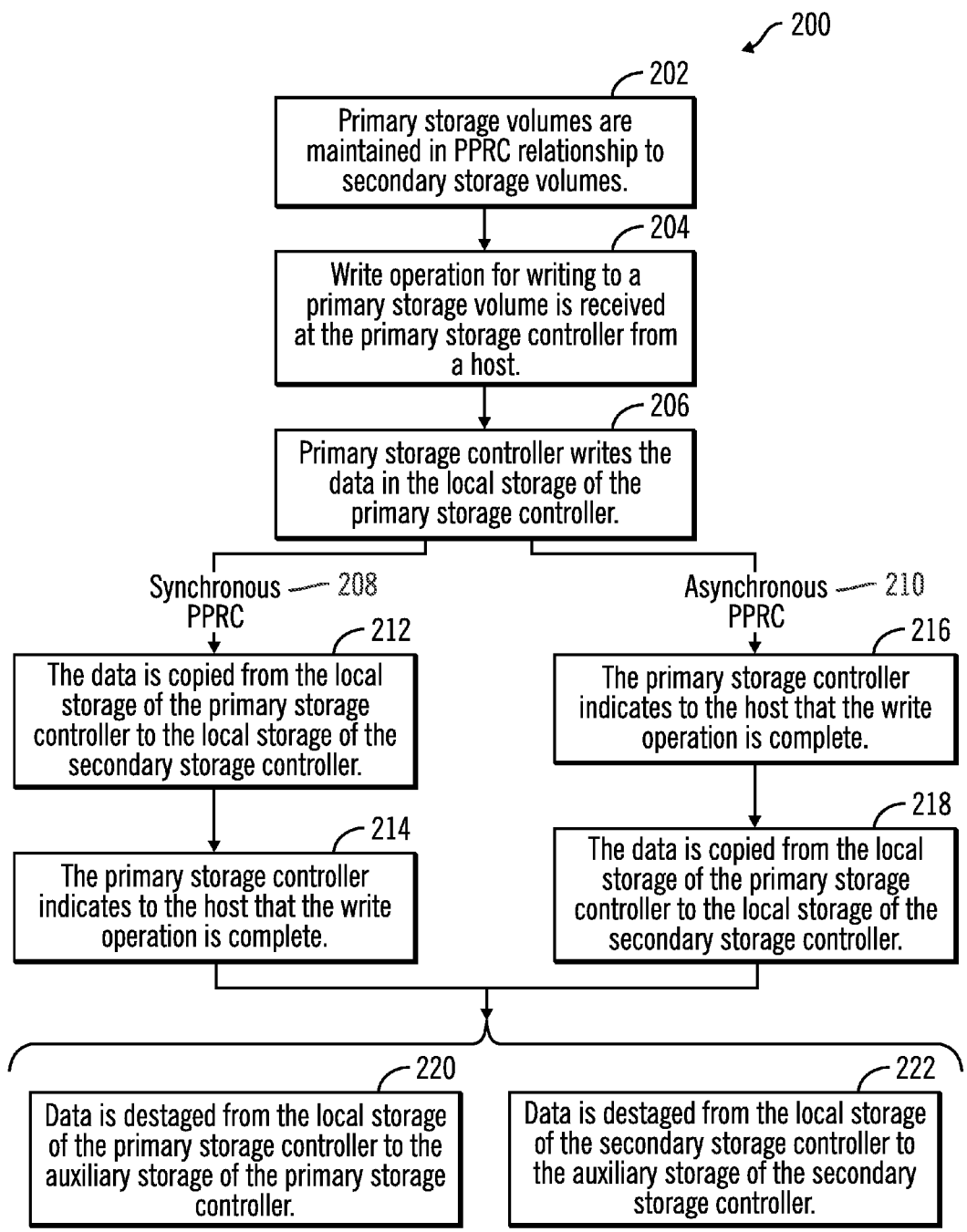
FIG. 2 illustrates a flowchart that shows how a peer to peer remote copy (PPRC) of storage volumes is established in the computing environment, in accordance with certain embodiments.

FIG. 2 illustrates a flowchart 200 that shows how a peer to peer remote copy (PPRC) of storage volumes is established in the computing environment 100, in accordance with certain embodiments.

Control starts at block 202 in which primary storage volumes 108 are maintained in a PPRC relationship 118 to secondary storage volumes 116. A write operation for writing to a primary storage volume 108 is received (at block 204) at the primary storage controller 102 from a host 106. The primary storage controller 102 writes (at block 206) the data corresponding to the write operation in the local storage 126 of the primary storage controller 102. Then if the PPRC relationship is a synchronous PPRC relationship (reference numeral 208) control proceeds to block 212 in which the data is copied from the local storage 126 of the primary storage controller 102 to the local storage 130 of the secondary storage controller 104, and the primary storage controller 102 then indicates (at block 214) to the host 106 that the write operation is complete.

From block 206 control proceeds to block 216 if the PPRC relationship 118 is an asynchronous PPRC relationship 210. At block 216, the primary storage controller 102 indicates to the host 106 that the write operation is complete, and the data is copied (at block 218) from the local storage 126 of the primary storage controller 102 to the local storage 130 of the secondary storage controller 104.

From blocks 214 and 218 control proceeds to blocks 220 and 222. In block 220, data is destaged from the local storage 126 of the primary storage controller 102 to the auxiliary storage 110 of the primary storage controller 102, and in block 222 data is destaged from the local storage 130 of the secondary storage controller 116 to the auxiliary storage 132 of the secondary storage controller 104.

Therefore, FIG. 2 illustrates certain embodiments in which an I/O operation may be indicated to the host 106 as being complete, even though the auxiliary storage has not been updated (via destaging from local storage) with the write corresponding to the I/O operation.

Figure 3:
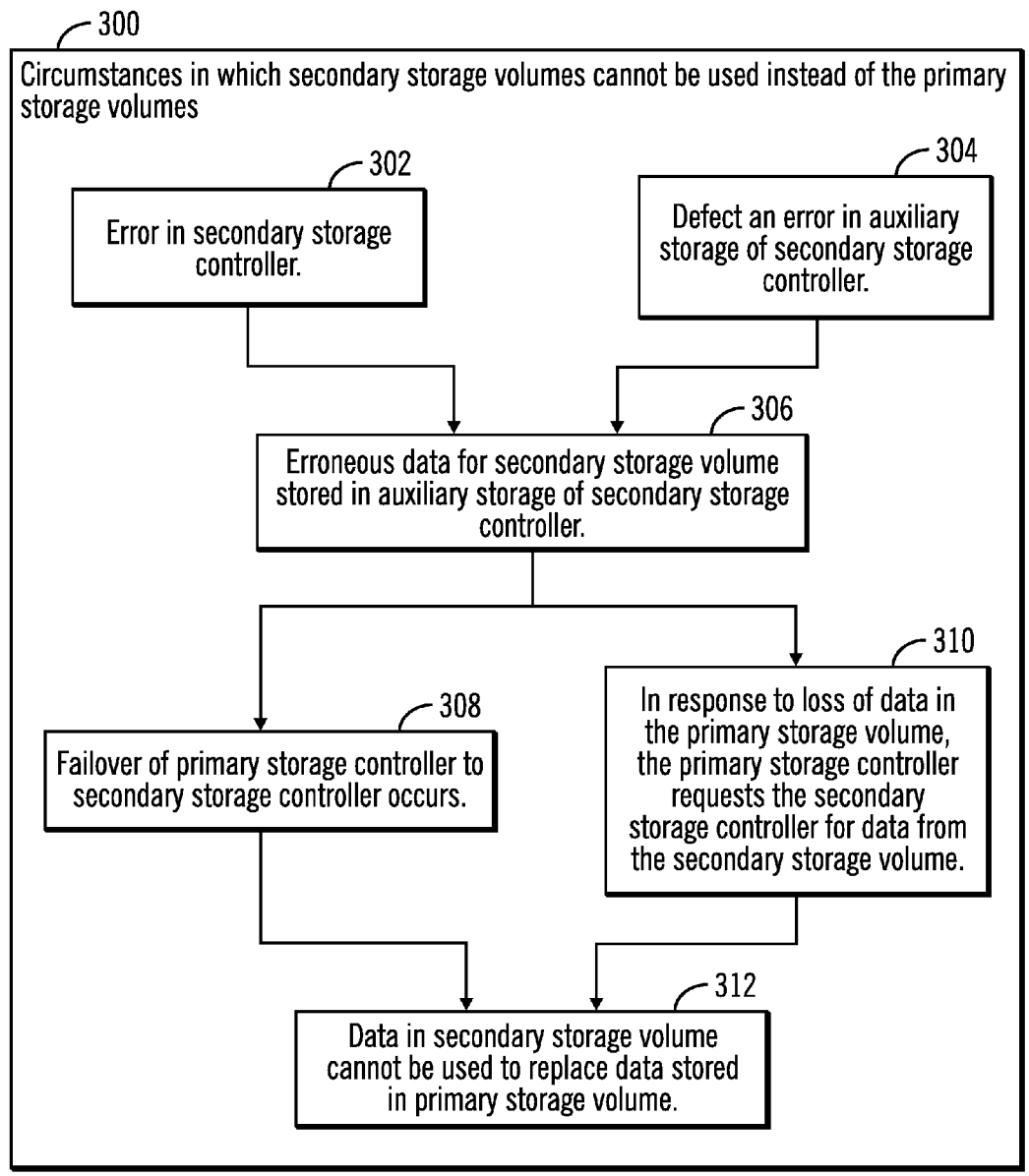
FIG. 3 illustrates a flowchart that shows circumstances in which secondary storage volumes cannot be used instead of primary storage volumes, in accordance with certain embodiments.

FIG. 3 illustrates a flowchart 300 that shows circumstances in which secondary storage volumes 116 cannot be used instead of primary storage volumes 108, in accordance with certain embodiments.

Control starts in parallel in block 302 and block 304, where in block 302 a determination is made that there is an error in a secondary storage controller 104 (e.g., secondary storage controller 104 is not operating properly), and in block 304 a detection is made of an error in the auxiliary storage 132 of the secondary storage controller 104.

From blocks 302, 304 control proceeds to block 306 in which it is determined that erroneous data for secondary storage volume 116 is stored in the auxiliary storage 132 of the secondary storage controller. Control proceeds in parallel to block 308 and 310. In block 308 a failover of the primary storage controller 102 to the secondary storage controller 104 occurs. In block 310, the primary storage controller 102 requests the secondary storage controller 104 for data from the secondary storage volume 116, in response to loss of data in the primary storage volume 108.

Control proceeds from block 308 and 310 to block 312, in which it is determined that data from the secondary storage volume 116 cannot be used to replace data stored in the primary storage volume 108. Therefore, when a failover needs to be done or when there is a loss of data in the primary storage controller 102, then at this critical stage the data in the secondary storage volume 116 cannot be used to replace the data stored in the primary storage volume 108. In certain embodiments mechanisms are provided to detect an error in a PPRC relationship between the primary storage volume 108 and the secondary storage volume 116 well in advance of the time at which data in secondary storage volume 116 is needed to replace the data stored in the primary storage volume 108.

Figure 4:
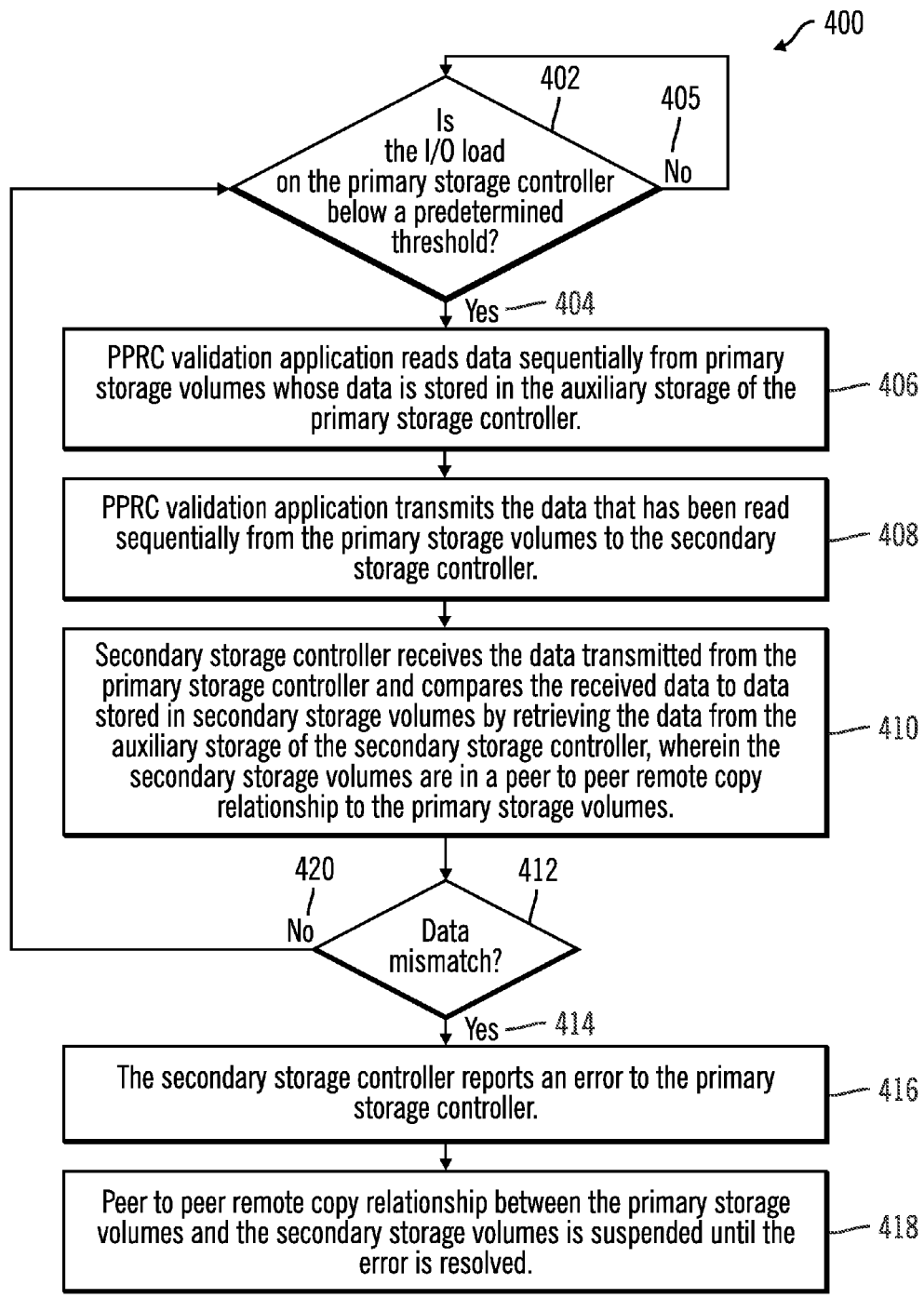
FIG. 4 illustrates a flowchart that shows validation of storage volumes that are in a PPRC relationship, in accordance with certain embodiments.

FIG. 4 illustrates a flowchart 400 that shows validation of storage volumes in a PPRC relationship, in accordance with certain embodiments.

Control starts at block 402 in which a determination is made by the storage management application 120 as to whether the I/O load on the primary storage controller 102 is below a predetermined threshold. If so ("Yes" branch 404) then control proceeds to block 406, and if not ("No" branch 405) then control remains in block 402.

At block 406 the PPRC validation application 138 reads data sequentially from primary storage volumes 108 whose data is stored in the auxiliary storage 110 of the primary storage controller 102. The PPRC validation application 138 transmits (at block 408) the data that has been read sequentially from the primary storage volumes 108 to the secondary storage controller 104.

The secondary storage controller 104 receives the data transmitted from the primary storage controller 102 and compares the received data to data stored in secondary storage volumes 116 by retrieving the data from the auxiliary storage 132 of the secondary storage controller 104, where the secondary storage volumes 116 are in a peer to peer remote copy relationship 118 to the primary storage volumes 108.

From block 410 control proceeds to block 412 in which the secondary storage controller 104 determines if there is a mismatch between the received data (corresponding to the primary storage volume 108) and the data stored in secondary storage volumes 116. If so ("Yes" branch 414) control proceeds to block 416 and if not ("No" branch 420) control returns to block 402.

If there is a data mismatch at block 412 ("Yes" branch 414) then control proceeds to block 416 in which the secondary storage controller 104 reports an error to the primary storage controller 102, and on receiving the error at the primary storage controller 102, the primary storage controller 102 suspends the peer to peer remote copy relationship 118 between the primary storage volumes 108 and the secondary storage volumes 116 until the error is resolved.

Therefore, FIG. 4 illustrates certain embodiments in which in the event of a data mismatch between the primary storage volume 108 and the secondary storage volume 116, the peer to peer remote copy relationship 118 between the primary storage volume 108 and the secondary storage volume 116 is suspended. Therefore, the secondary storage volume 116 is no longer indicated to be a copy of the primary storage volume 108. It should be noted that when the primary storage volume 108 and the secondary storage volume 116 are in a peer to peer remote copy relationship, the secondary storage volume 116 is a copy of the primary storage volume 108.

Figure 5:
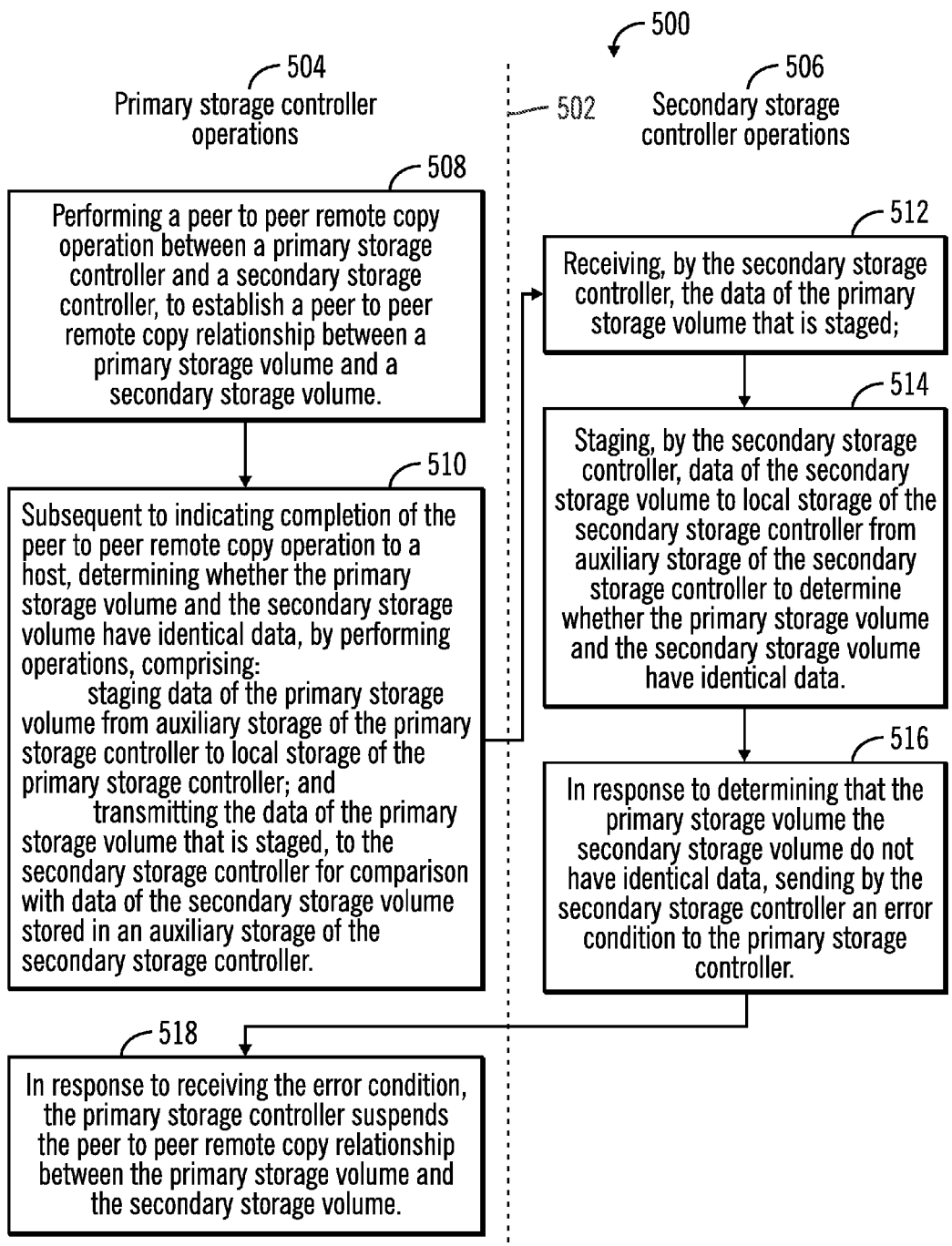
FIG. 5 illustrates a flowchart that shows validation of storage volumes that are in a PPRC relationship, via operations performed by a primary storage controller and a secondary storage controller, in accordance with certain embodiments.

FIG. 5 illustrates a flowchart 500 that shows validation of storage volumes that are in a PPRC relationship 118, via operations performed by a primary storage controller 102 and a secondary storage controller 104, in accordance with certain embodiments. In FIG. 5 the operations of the primary storage controller (reference numeral 504) are shown to the left of the dashed line 502, and the operations of the secondary storage controller (reference numeral 506) are shown to the right of the dashed line 502.

Control starts at block 508 in which a peer to peer remote copy operation is performed between a primary storage controller 102 and a secondary storage controller 104, to establish a peer to peer remote copy relationship 118 between a primary storage volume 108 and a secondary storage volume 116. Subsequent to indicating completion of the peer to peer remote copy operation to a host 106, a determination is made (at block 510) as to whether the primary storage volume 108 and the secondary storage volume 116 have identical data, by performing operations of staging data of the primary storage volume 108 from auxiliary storage 110 of the primary storage controller 102 to local storage 126 of the primary storage controller 102, and by transmitting the data of the primary storage volume 108 that is staged, to the secondary storage controller 104 for comparison with data of the secondary storage volume 116 stored in an auxiliary storage 132 of the secondary storage controller 104.

From block 510 control proceeds to block 512 in which the secondary storage controller 104 receives the data of the primary storage volume 108 that is staged. The secondary storage controller 104 stages data of the secondary storage volume 116 to local storage 130 of the secondary storage controller 104 from auxiliary storage 132 of the secondary storage controller 104 to determine (at block 514) whether the primary storage volume 108 and the secondary storage volume 116 have identical data. In response to determining that the primary storage volume 108 and the secondary storage volume 116 do not have identical data, the secondary storage controller 104 sends (at block 516) an error condition to the primary storage controller 102.

From block 516 control proceeds to block 518 in which in response to receiving the error condition, the primary storage controller 102 suspends the peer to peer remote copy relationship 118 between the primary storage volume 108 and the secondary storage volume 116. Remedial action may now to taken to recover from the error indicated by the error condition.

Figure 6:
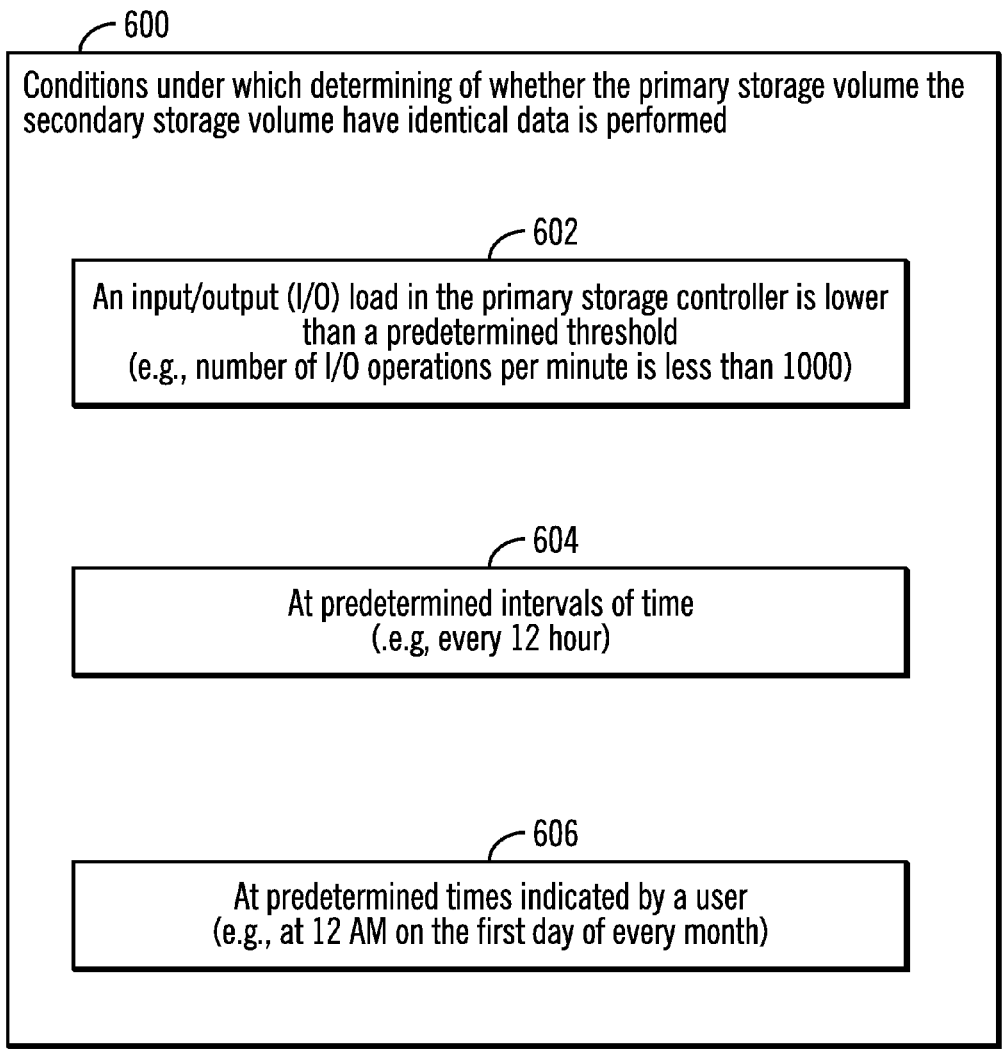
FIG. 6 illustrates a diagram that shows conditions under which determining of whether a primary storage volume and a secondary storage volume have identical data is performed, in accordance with certain embodiments.

FIG. 6 illustrates a diagram 600 that shows conditions under which determining of whether a primary storage volume 108 and a secondary storage volume 116 have identical data is performed, in accordance with certain embodiments.

In certain embodiments, the determining of whether the primary storage volume 108 and the secondary storage volume 116 have identical data is performed, in response to determining that an I/O load in the primary storage controller 102 is lower than a predetermined threshold (as shown via reference numeral 602). For example, in certain embodiments the predetermined threshold may be that the number of I/O operations per minute is 1000. If the number of I/O operations per minute is less than 1000 then the determining of whether the primary storage volume 108 and the secondary storage volume 116 have identical data is performed.

In certain embodiments, the determining of whether the primary storage volume 108 and the secondary storage volume 116 have identical data is performed (at block 604) at predetermined intervals of time (e.g., every 12 hour). In further embodiments, the determining of whether the primary storage volume 108 and the secondary storage volume 116 have identical data is performed (at block 606) at predetermined times indicated by a user (e.g., 12 AM on the first day of every month).

Figure 7:
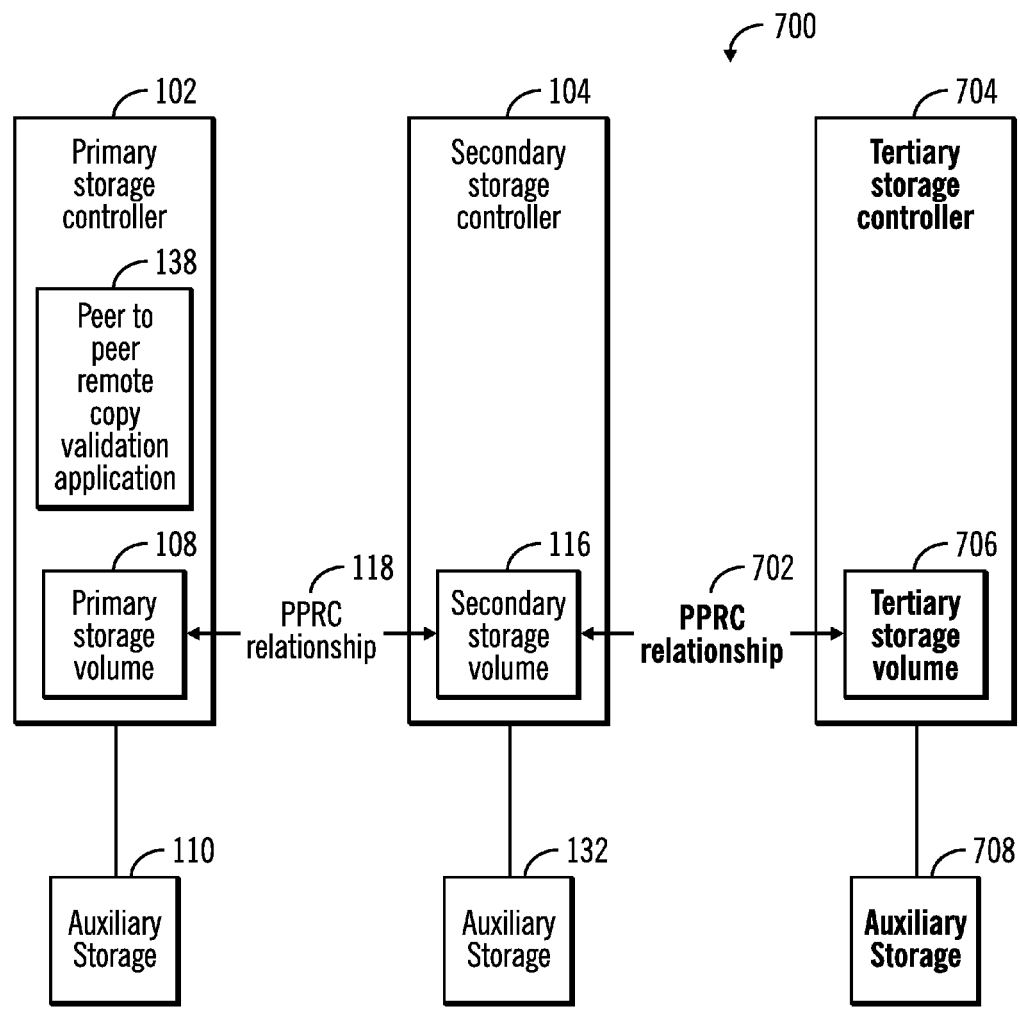
FIG. 7 illustrates a block diagram that shows validation of storage volumes in a PPRC relationship in a system comprising a primary storage controller, a secondary storage controller, and a tertiary storage controller, in accordance with certain embodiments.

FIG. 7 illustrates a block diagram 700 that shows validation of storage volumes in PPRC relationships 118, 702 in a system comprising a primary storage controller 102, a secondary storage controller 104, and a tertiary storage controller 704, in accordance with certain embodiments. In FIG. 7, the primary storage volume 108 of the primary storage controller 102 is in a PPRC relationship 118 with the secondary storage volume 116 of the secondary storage controller 104. The secondary storage volume 116 of the secondary storage controller 104 is in a PPRC relationship 702 with the tertiary storage volume 706 of the tertiary storage controller 704. Thus the primary storage volume 108, the secondary storage volume 116, and the tertiary storage volume 706 are all expected to have the same data.

In certain embodiments, the primary storage controller 102, the secondary storage controller 104 and the tertiary storage controller 704 interface among themselves to compare the primary storage volume 108, the secondary storage volume 116, and the tertiary storage volume 706 after staging from the auxiliary storages 110, 132, 708. If the primary storage volume 108, the secondary storage volume 116, and the tertiary storage volume 706 do not all have identical data then the PPRC relationships 118, 702 are suspended and remedial action taken to fix the error.

Therefore, FIGS. 1-7 illustrate certain embodiments to determine whether storage volumes in a PPRC relationship have identical data by staging the storage volumes from auxiliary storage after PPRC operations have completed. In case the storage volumes in PPRC relationship do not have identical data, remedial action is taken to fix the error, prior to a failover of the primary storage controller to a secondary storage controller or a tertiary storage controller, or prior to a need for secondary or tertiary storage volumes to replace a primary storage volume.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 8:
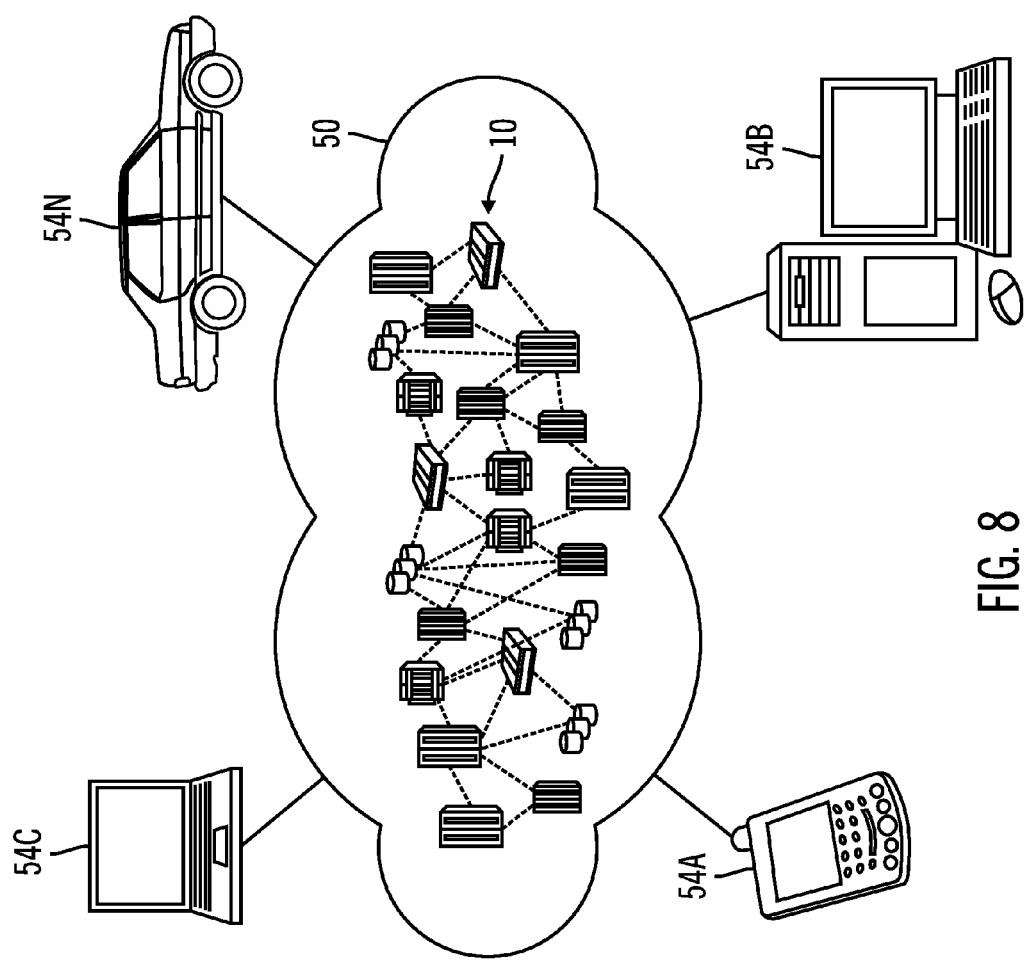
FIG. 8 illustrates a block diagram of a cloud computing environment, in accordance with certain embodiments.

Referring now to FIG. 8, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
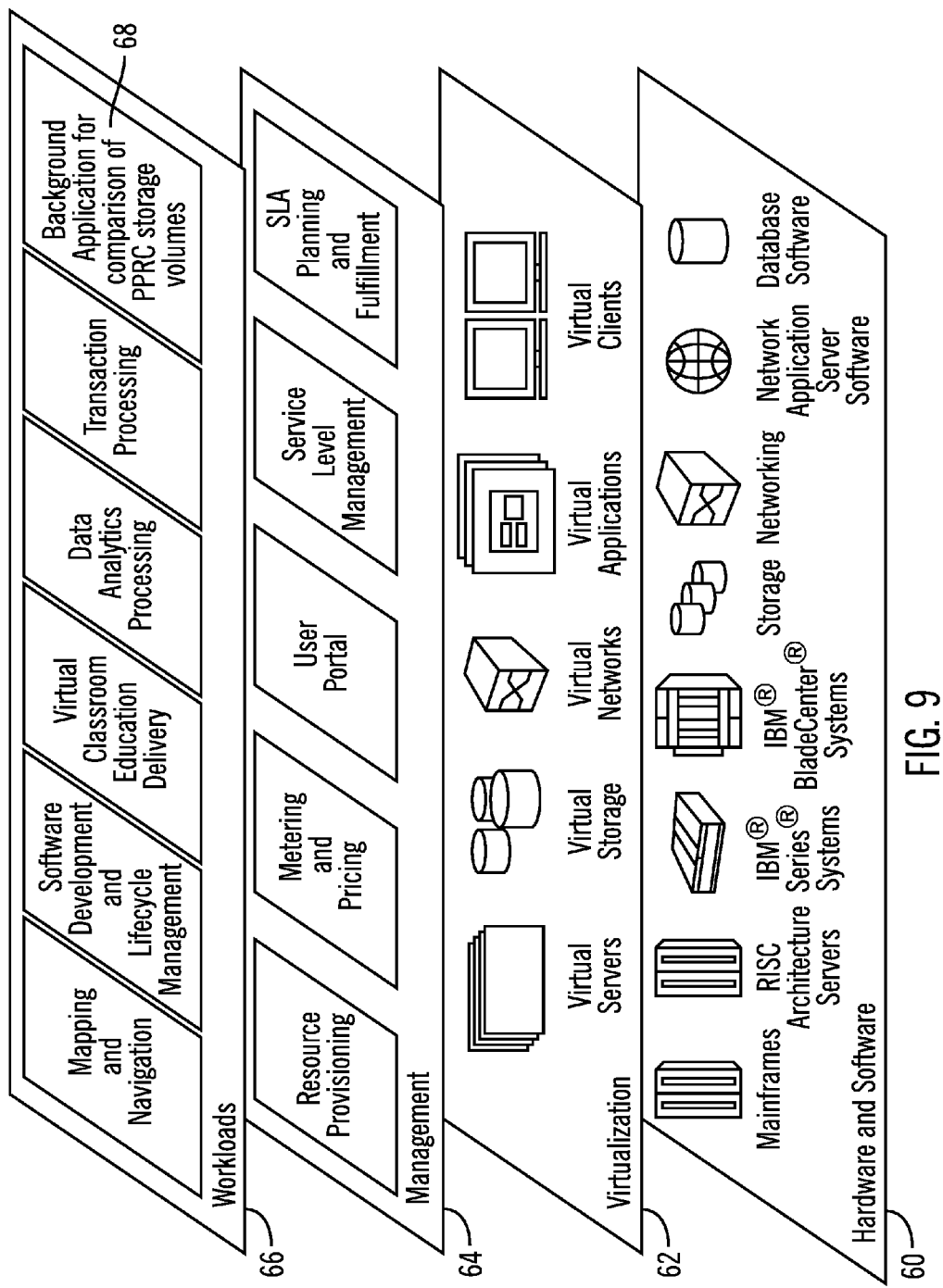
FIG. 9 illustrates a block diagram of further details of the cloud computing environment of FIG. 8, in accordance with certain embodiments.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

* IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and the driver software and the background application for comparison of PPRC storage volumes 68 as shown in FIGS. 1-8.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 10:
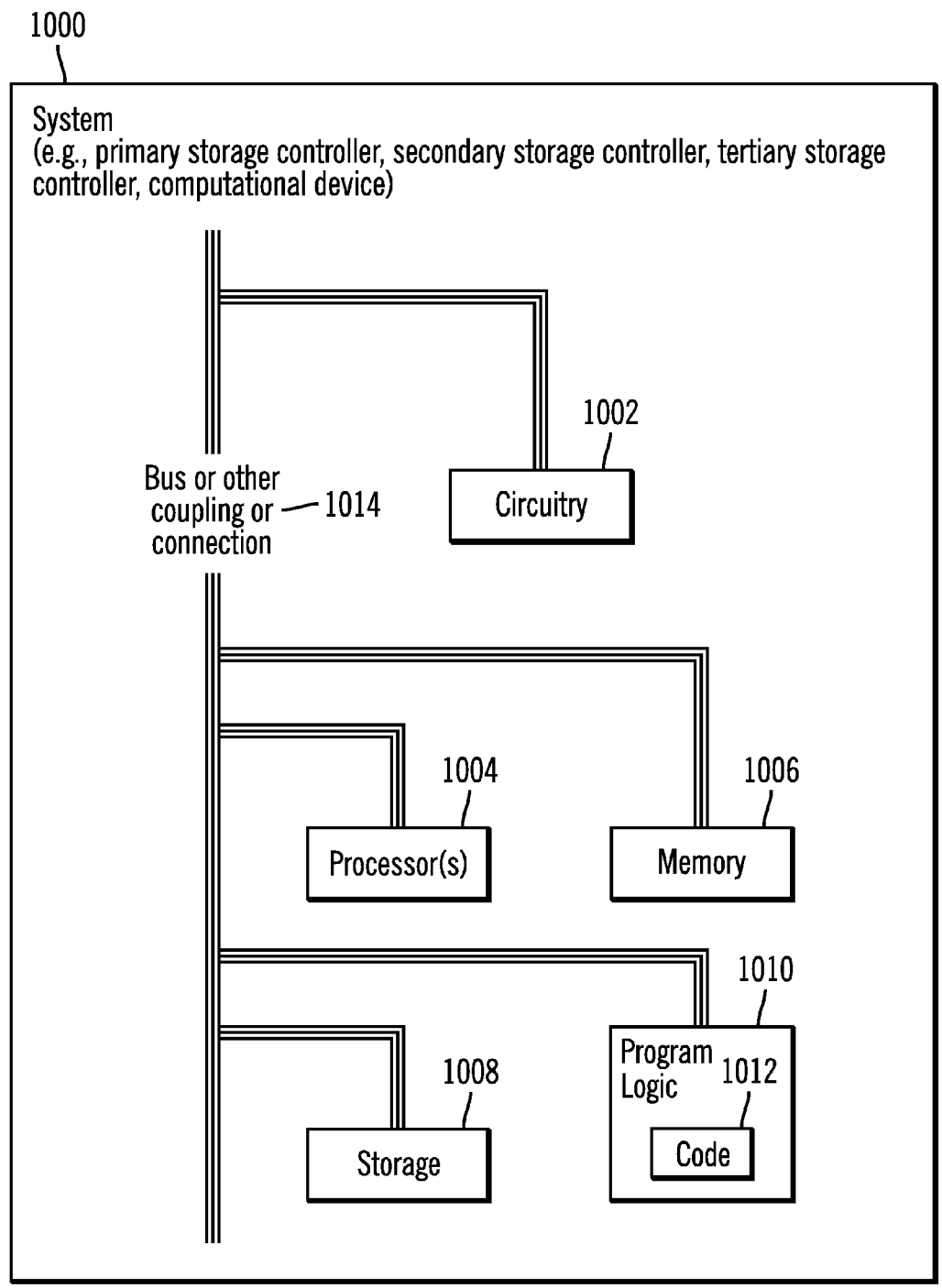
FIG. 10 illustrates a block diagram of a computational system that shows certain elements that may be included in the storage controllers and/or the host(s), as described in FIGS. 1-9, in accordance with certain embodiments.

FIG. 10 illustrates a block diagram that shows certain elements that may be included in the primary storage controller 102, the secondary storage controller 104, the tertiary storage controller 704, the hosts 106, or other computational devices in accordance with certain embodiments. The system 1000 may include a circuitry 1002 that may in certain embodiments include at least a processor 1004. The system 1000 may also include a memory 1006 (e.g., a volatile memory device), and storage 1008. The storage 1008 may include a non-volatile memory device (e.g., EEPROM, ROM, PROM, flash, firmware, programmable logic, etc.), magnetic disk drive, optical disk drive, tape drive, etc. The storage 1008 may comprise an internal storage device, an attached storage device and/or a network accessible storage device. The system 1000 may include a program logic 1010 including code 1012 that may be loaded into the memory 1006 and executed by the processor 1004 or circuitry 1002. In certain embodiments, the program logic 1010 including code 1012 may be stored in the storage 1008. In certain other embodiments, the program logic 1010 may be implemented in the circuitry 1002. One or more of the components in the system 1000 may communicate via a bus or via other coupling or connection 1014. Therefore, while FIG. 10 shows the program logic 1010 separately from the other elements, the program logic 1010 may be implemented in the memory 1006 and/or the circuitry 1002.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
performing a peer to peer remote copy operation between a primary storage controller and a secondary storage controller, to establish a peer to peer remote copy relationship between a primary storage volume and a secondary storage volume; and
subsequent to indicating completion of the peer to peer remote copy operation to a host, and in response to determining that an input/output (I/O) load in the primary storage controller is lower than a predetermined threshold, determining whether the primary storage volume and the secondary storage volume have identical data, by performing operations, comprising:
staging data of the primary storage volume from auxiliary storage of the primary storage controller to local storage of the primary storage controller; and
transmitting the data of the primary storage volume that is staged, to the secondary storage controller for comparison with data of the secondary storage volume stored in an auxiliary storage of the secondary storage controller, wherein completion of the peer to peer remote copy operation is indicated by the primary storage controller to a host prior to completion of data destages to the auxiliary storage of the primary storage controller from the local storage of the primary storage controller, and prior to completion of data destages to the auxiliary storage of the secondary storage controller from the local storage of the secondary storage controller.

2. The method of claim 1, wherein the determining of whether the primary storage volume and the secondary storage volume have identical data is performed at predetermined intervals of time.

3. A method, comprising:
performing a peer to peer remote copy operation between a primary storage controller and a secondary storage controller, to establish a peer to peer remote copy relationship between a primary storage volume and a secondary storage volume; and
subsequent to indicating completion of the peer to peer remote copy operation to a host, determining whether the primary storage volume and the secondary storage volume have identical data, by performing operations, comprising:
staging data of the primary storage volume from auxiliary storage of the primary storage controller to local storage of the primary storage controller; and
transmitting the data of the primary storage volume that is staged, to the secondary storage controller for comparison with data of the secondary storage volume stored in an auxiliary storage of the secondary storage controller, wherein the method further comprises:
receiving, by the secondary storage controller, the data of the primary storage volume that is staged;
staging, by the secondary storage controller, data of the secondary storage volume to local storage of the secondary storage controller from auxiliary storage of the secondary storage controller to determine whether the primary storage volume and the secondary storage volume have identical data; and
in response to determining that the primary storage volume and the secondary storage volume do not have identical data, sending by the secondary storage controller an error condition to the primary storage controller, wherein in response to receiving the error condition, the primary storage controller suspends the peer to peer remote copy relationship between the primary storage volume and the secondary storage volume.

4. A method, comprising:
performing a peer to peer remote copy operation between a primary storage controller and a secondary storage controller, to establish a peer to peer remote copy relationship between a primary storage volume and a secondary storage volume; and
subsequent to indicating completion of the peer to peer remote copy operation to a host, determining whether the primary storage volume and the secondary storage volume have identical data, by performing operations, comprising:
staging data of the primary storage volume from auxiliary storage of the primary storage controller to local storage of the primary storage controller; and
transmitting the data of the primary storage volume that is staged, to the secondary storage controller for comparison with data of the secondary storage volume stored in an auxiliary storage of the secondary storage controller, wherein the determining of whether the primary storage volume and the secondary storage volume have identical data is performed at predetermined times indicated by a user, wherein a tertiary storage volume of a tertiary storage controller maintains another peer to peer remote copy relationship with the secondary storage volume, and wherein an error condition is generated if the primary storage volume, the secondary storage volume and the tertiary storage volume do not have identical data.

5. A system, comprising:
a memory; and
a processor coupled to the memory, wherein the processor performs operations, the operations performed by the processor comprising:
  performing a peer to peer remote copy operation between a primary storage controller and a secondary storage controller, to establish a peer to peer remote copy relationship between a primary storage volume and a secondary storage volume; and
  subsequent to indicating completion of the peer to peer remote copy operation to a host, and in response to determining that an input/output (I/O) load in the primary storage controller is lower than a predetermined threshold, determining whether the primary storage volume and the secondary storage volume have identical data, by performing operations, comprising:
    staging data of the primary storage volume from auxiliary storage of the primary storage controller to local storage of the primary storage controller; and
    transmitting the data of the primary storage volume that is staged, to the secondary storage controller for comparison with data of the secondary storage volume stored in an auxiliary storage of the secondary storage controller, wherein completion of the peer to peer remote copy operation is indicated by the primary storage controller to a host prior to completion of data destages to the auxiliary storage of the primary storage controller from the local storage of the primary storage controller, and prior to completion of data destages to the auxiliary storage of the secondary storage controller from the local storage of the secondary storage controller.

6. The system of claim 5, wherein the determining of whether the primary storage volume and the secondary storage volume have identical data is performed at predetermined intervals of time.

7. A system, comprising:
a memory; and
a processor coupled to the memory, wherein the processor performs operations, the operations performed by the processor comprising:
  performing a peer to peer remote copy operation between a primary storage controller and a secondary storage controller, to establish a peer to peer remote copy relationship between a primary storage volume and a secondary storage volume; and
  subsequent to indicating completion of the peer to peer remote copy operation to a host, determining whether the primary storage volume and the secondary storage volume have identical data, by performing operations, comprising:
    staging data of the primary storage volume from auxiliary storage of the primary storage controller to local storage of the primary storage controller; and
    transmitting the data of the primary storage volume that is staged, to the secondary storage controller for comparison with data of the secondary storage volume stored in an auxiliary storage of the secondary storage controller, wherein the operations further comprise:
    receiving, by the secondary storage controller, the data of the primary storage volume that is staged;
    staging, by the secondary storage controller, data of the secondary storage volume to local storage of the secondary storage controller from auxiliary storage of the secondary storage controller to determine whether the primary storage volume and the secondary storage volume have identical data; and
    in response to determining that the primary storage volume and the secondary storage volume do not have identical data, sending by the secondary storage controller an error condition to the primary storage controller, wherein in response to receiving the error condition, the primary storage controller suspends the peer to peer remote copy relationship between the primary storage volume and the secondary storage volume.

8. A system, comprising:
a memory; and
a processor coupled to the memory, wherein the processor performs operations, the operations performed by the processor comprising:
  performing a peer to peer remote copy operation between a primary storage controller and a secondary storage controller, to establish a peer to peer remote copy relationship between a primary storage volume and a secondary storage volume; and
  subsequent to indicating completion of the peer to peer remote copy operation to a host, determining whether the primary storage volume and the secondary storage volume have identical data, by performing:
    staging data of the primary storage volume from auxiliary storage of the primary storage controller to local storage of the primary storage controller; and
    transmitting the data of the primary storage volume that is staged, to the secondary storage controller for comparison with data of the secondary storage volume stored in an auxiliary storage of the secondary storage controller, wherein the determining of whether the primary storage volume and the secondary storage volume have identical data is performed at predetermined times indicated by a user, wherein a tertiary storage volume of a tertiary storage controller maintains another peer to peer remote copy relationship with the secondary storage volume, and wherein an error condition is generated if the primary storage volume, the secondary storage volume and the tertiary storage volume do not have identical data.

9. A computer program product, the computer program product comprising a computer readable storage medium having computer readable program code embodied therewith, the computer readable program code configured to perform operations, the operations comprising:
  performing a peer to peer remote copy operation between a primary storage controller and a secondary storage controller, to establish a peer to peer remote copy relationship between a primary storage volume and a secondary storage volume; and
  subsequent to indicating completion of the peer to peer remote copy operation to a host, and in response to determining that an input/output (I/O) load in the primary storage controller is lower than a predetermined threshold, determining whether the primary storage volume and the secondary storage volume have identical data, by:

staging data of the primary storage volume from auxiliary storage of the primary storage controller to local storage of the primary storage controller; and transmitting the data of the primary storage volume that is staged, to the secondary storage controller for comparison with data of the secondary storage volume stored in an auxiliary storage of the secondary storage controller, wherein completion of the peer to peer remote copy operation is indicated by the primary storage controller to a host prior to completion of data destages to the auxiliary storage of the primary storage controller from the local storage of the primary storage controller, and prior to completion of data destages to the auxiliary storage of the secondary storage controller from the local storage of the secondary storage controller.

10. The computer program product of claim 9, wherein the determining of whether the primary storage volume and the secondary storage volume have identical data is performed at predetermined intervals of time.

11. A computer program product, the computer program product comprising a computer readable storage medium having computer readable program code embodied therewith, the computer readable program code configured to perform operations, the operations comprising:

performing a peer to peer remote copy operation between a primary storage controller and a secondary storage controller, to establish a peer to peer remote copy relationship between a primary storage volume and a secondary storage volume; and subsequent to indicating completion of the peer to peer remote copy operation to a host, determining whether the primary storage volume and the secondary storage volume have identical data, by performing operations, comprising:

staging data of the primary storage volume from auxiliary storage of the primary storage controller to local storage of the primary storage controller; and transmitting the data of the primary storage volume that is staged, to the secondary storage controller for comparison with data of the secondary storage volume stored in an auxiliary storage of the secondary storage controller, wherein the operations further comprise:

receiving, by the secondary storage controller, the data of the primary storage volume that is staged;

staging, by the secondary storage controller, data of the secondary storage volume to local storage of the secondary storage controller from auxiliary storage of the secondary storage controller to determine whether the primary storage volume and the secondary storage volume have identical data; and in response to determining that the primary storage volume and the secondary storage volume do not have identical data, sending by the secondary storage controller an error condition to the primary storage controller, wherein in response to receiving the error condition, the primary storage controller suspends the peer to peer remote copy relationship between the primary storage volume and the secondary storage volume.

12. A computer program product, the computer program product comprising a computer readable storage medium having computer readable program code embodied therewith, the computer readable program code configured to perform operations, the operations comprising:

performing a peer to peer remote copy operation between a primary storage controller and a secondary storage controller, to establish a peer to peer remote copy relationship between a primary storage volume and a secondary storage volume; and subsequent to indicating completion of the peer to peer remote copy operation to a host, determining whether the primary storage volume and the secondary storage volume have identical data, by:

staging data of the primary storage volume from auxiliary storage of the primary storage controller to local storage of the primary storage controller; and transmitting the data of the primary storage volume that is staged, to the secondary storage controller for comparison with data of the secondary storage volume stored in an auxiliary storage of the secondary storage controller, wherein the determining of whether the primary storage volume and the secondary storage volume have identical data is performed at predetermined intervals of time, wherein the determining of whether the primary storage volume and the secondary storage volume have identical data is performed at predetermined times indicated by a user, wherein a tertiary storage volume of a tertiary storage controller maintains another peer to peer remote copy relationship with the secondary storage volume, and wherein an error condition is generated if the primary storage volume, the secondary storage volume and the tertiary storage volume do not have identical data.

* * * * *